(12) United States Patent
Koyama (10) Patent No.: US 7,990,591 B2
(45) Date of Patent: Aug. 2, 2011

(54) IMAGE PROCESSING DEVICE AND IMAGE DISPLAY DEVICE

(75) Inventor: Fumio Koyama, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 678 days.

(21) Appl. No.: 12/035,665

(22) Filed: Feb. 22, 2008

(65) Prior Publication Data

US 2008/0204779 A1 Aug. 28, 2008

(30) Foreign Application Priority Data

Feb. 23, 2007 (JP) .................................. 2007-043708

(51) Int. Cl.
*H04N 1/46* (2006.01)
*H04N 1/60* (2006.01)
*G06K 9/00* (2006.01)

(52) U.S. Cl. ..................... 358/525; 358/1.9; 382/167

(58) Field of Classification Search .............. 358/1.9, 358/523, 524, 525, 530, 1.6, 3.23; 382/167, 382/164, 166; 345/572, 536
See application file for complete search history.

(56) References Cited

U.S. PATENT DOCUMENTS

| | | | | |
|---|---|---|---|---|
| 5,132,786 A * | 7/1992 | Ishiwata | ........................ | 358/500 |
| 5,475,510 A | 12/1995 | Ikegami | | |
| 5,754,184 A * | 5/1998 | Ring et al. | ..................... | 345/604 |
| 6,571,010 B1 * | 5/2003 | Inoue | ............................ | 382/162 |
| 6,707,463 B1 * | 3/2004 | Gibson et al. | ................. | 345/619 |
| 7,061,505 B2 * | 6/2006 | Matsuzaki et al. | ............ | 345/600 |
| 7,564,604 B2 * | 7/2009 | Shirasawa | ..................... | 358/529 |
| 2002/0015180 A1 * | 2/2002 | Tominaga | ................... | 358/1.15 |
| 2002/0145745 A1 * | 10/2002 | Kanno | ............................ | 358/1.9 |
| 2003/0165266 A1 * | 9/2003 | Kagawa et al. | ............... | 382/166 |
| 2004/0184056 A1 | 9/2004 | Ikeda | | |
| 2004/0196381 A1 * | 10/2004 | Matsuzaka | ................. | 348/222.1 |
| 2005/0140997 A1 * | 6/2005 | Shirasawa | ...................... | 358/1.9 |
| 2005/0149864 A1 * | 7/2005 | Matsuzaki et al. | ............ | 715/528 |
| 2006/0077409 A1 * | 4/2006 | Hoshii | ............................ | 358/1.9 |
| 2007/0046681 A1 * | 3/2007 | Nagashima | ................... | 345/536 |
| 2007/0126744 A1 * | 6/2007 | Tsutsumi | ...................... | 345/520 |
| 2007/0195342 A1 * | 8/2007 | Sugiura et al. | ................. | 358/1.9 |

FOREIGN PATENT DOCUMENTS

| | | |
|---|---|---|
| JP | B-58-016180 | 3/1983 |
| JP | A-5-110840 | 4/1993 |
| JP | A-2001-320593 | 11/2001 |
| JP | A-2004-235993 | 8/2004 |
| JP | A-2005-249820 | 9/2005 |
| JP | A-2005-249821 | 9/2005 |
| JP | A-2007-248838 | 9/2007 |
| JP | A-2007-267084 | 10/2007 |

* cited by examiner

*Primary Examiner* — Madeleine A Nguyen (74) *Attorney, Agent, or Firm* — Oliff & Berridge PLC (57) ABSTRACT

An image processing device for converting a color tone of an image includes: an input unit to which an image is input; a designation unit that designates precision of color conversion performed on the input image; a color conversion table that stores output color data after color conversion of color data, which is determined according to the designated precision and may be included in the image, in an address space determined according to the precision; an address specifying unit that specifies an address referring to the color conversion table on the basis of a first portion, which is determined according to the precision, of color data expressing the input image; a color converting unit that converts the color data included in the input image into output color data by referring to the specified address of the color conversion table; a parameter specifying unit that specifies a parameter for interpolating a color, which is expressed by the output color data, on the basis of a second portion other than the first portion of the color data included in the input image; and an interpolation unit that interpolates a color, which is expressed by the converted output color data, on the basis of the specified parameter.

8 Claims, 8 Drawing Sheets

ADDRESS WHEN CINEMA MODE IS SET

| INPUT COLOR DATA | | | ADDRESS | REFERENCE |
|---|---|---|---|---|
| B | G | R | | |
| 0 | 0 | 0 | 0 | 00000000 |
| 0 | 0 | 16 | 1 | 00010000 |
| 0 | 0 | 32 | 2 | 00100000 |
| 0 | 0 | 48 | 3 | 00110000 |
| 0 | 0 | 64 | 4 | 01000000 |
| 0 | 0 | 80 | 5 | 01010000 |
| 0 | 0 | 96 | 6 | 01100000 |
| 0 | 0 | 112 | 7 | 01110000 |
| 0 | 0 | 128 | 8 | 10000000 |
| 0 | 0 | 144 | 9 | 10010000 |
| 0 | 0 | 160 | 10 | 10100000 |
| 0 | 0 | 176 | 11 | 10110000 |
| 0 | 0 | 192 | 12 | 11000000 |
| 0 | 0 | 208 | 13 | 11010000 |
| 0 | 0 | 224 | 14 | 11100000 |
| 0 | 0 | 240 | 15 | 11110000 |
| 0 | 0 | 255 | 16 | 11111111 |
| 0 | 16 | 0 | 17 | |
| 0 | 16 | 16 | 18 | |
| 0 | 16 | 32 | 19 | |
| ⋮ | ⋮ | ⋮ | ⋮ | |
| 0 | 255 | 224 | 286 | |
| 0 | 255 | 240 | 287 | |
| 0 | 255 | 255 | 288 | |
| 16 | 0 | 0 | 289 | |
| 16 | 0 | 16 | 290 | |
| 16 | 0 | 32 | 291 | |
| ⋮ | ⋮ | ⋮ | ⋮ | |
| 255 | 255 | 224 | 4910 | |
| 255 | 255 | 240 | 4911 | |
| 255 | 255 | 255 | 4912 | |

FIG. 4

ADDRESS WHEN TELEVISION MODE IS SET

| INPUT COLOR DATA | | | ADDRESS | REFERENCE |
| --- | --- | --- | --- | --- |
| B | G | R | | |
| 0 | 0 | 0 | 0 | 00000000 |
| 0 | 0 | 32 | 1 | 00100000 |
| 0 | 0 | 64 | 2 | 01000000 |
| 0 | 0 | 96 | 3 | 01100000 |
| 0 | 0 | 128 | 4 | 10000000 |
| 0 | 0 | 160 | 5 | 10100000 |
| 0 | 0 | 192 | 6 | 11000000 |
| 0 | 0 | 224 | 7 | 11100000 |
| 0 | 0 | 255 | 8 | 11111111 |
| 0 | 32 | 0 | 9 | |
| 0 | 32 | 32 | 10 | |
| 0 | 32 | 64 | 11 | |
| 0 | 32 | 96 | 12 | |
| 0 | 32 | 128 | 13 | |
| 0 | 32 | 160 | 14 | |
| 0 | 32 | 192 | 15 | |
| 0 | 32 | 224 | 16 | |
| 0 | 32 | 255 | 17 | |
| ⋮ | ⋮ | ⋮ | ⋮ | |
| 255 | 255 | 192 | 726 | |
| 255 | 255 | 224 | 727 | |
| 255 | 255 | 255 | 728 | |

FIG. 5

ADDRESS WHEN PRESENTATION MODE IS SET

| INPUT COLOR DATA | | | ADDRESS | REFERENCE |
|---|---|---|---|---|
| B | G | R | | |
| 0 | 0 | 0 | 0 | 00000000 |
| 0 | 0 | 64 | 1 | 01000000 |
| 0 | 0 | 128 | 2 | 10000000 |
| 0 | 0 | 192 | 3 | 11000000 |
| 0 | 0 | 255 | 4 | 11111111 |
| 0 | 64 | 0 | 5 | |
| 0 | 64 | 64 | 6 | |
| 0 | 64 | 128 | 7 | |
| 0 | 64 | 192 | 8 | |
| 0 | 64 | 255 | 9 | |
| ⋮ | ⋮ | ⋮ | ⋮ | |
| 255 | 255 | 0 | 120 | |
| 255 | 255 | 64 | 121 | |
| 255 | 255 | 128 | 122 | |
| 255 | 255 | 192 | 123 | |
| 255 | 255 | 255 | 124 | |

IMAGE PROCESSING DEVICE AND IMAGE DISPLAY DEVICE

The entire disclosure of Japanese Patent Application No. 2007-043708, filed Feb. 23, 2007 is expressly incorporated by reference herein.

BACKGROUND

1. Technical Field

The present invention relates to a technique of converting a color tone of an image.

2. Related Art

In recent years, many image display devices, such as CRT displays, liquid crystal displays, plasma displays, and projectors, have a plurality of output modes of an image that is displayed. Such modes include a dynamic mode in which brightness or saturation is emphasized, a cinema mode in which correction to a color tone suitable for watching a movie is made, and the like.

As a technique of performing color conversion according to an output mode, there is a technique of using a three-dimensional lookup table (hereinafter, referred to as "3D-LUT") (refer to JP-B-58-16180). The relationship of correspondence between an input color and an output color is recorded in the 3D-LUT. An image display device stores the 3D-LUT in a memory and converts a color tone by referring to the stored 3D-LUT. The image display device can meet various kinds of modes by properly rewriting the 3D-LUT stored in the memory according to an output mode.

In the 3D-LUT, the data volume is increased if color conversion is performed with high precision. As a result, the size of a circuit for performing color conversion is increased. For this reason, the circuit for performing color conversion was redesigned, in many cases, for every model according to the purpose of use and price range of an image display device. However, as an integration degree of an LSI increases in recent years, it has become possible to share a color conversion circuit with relatively low cost even if a circuit is not designed for every model. However, among image display devices, there is an image display device, such as a low-cost projector used for presentation, which does not require such precision of color conversion. Accordingly, in the case of sharing a circuit on the basis of the specification of a high-class model, there was a case in which the excessive quality was obtained depending on a model of an image display device. In addition, if the data volume of the 3D-LUT is increased, it takes time to load the data to a memory. As a result, depending on a model or application of an image display device, there was a possibility that an adverse effect would be noticeable, for example, it would take time to perform switching of an output mode although such precision of color conversion was not necessary.

SUMMARY

An advantage of some aspects of the invention is that it provides a device capable of meeting color conversion with various kinds of precision.

According to an aspect of the invention, an image processing device for converting a color tone of an image includes: an input unit to which an image is input; a designation unit that designates precision of color conversion performed on the input image; a color conversion table that stores output color data after color conversion of color data, which is determined according to the designated precision and may be included in the image, in an address space determined according to the precision; an address specifying unit that specifies an address referring to the color conversion table on the basis of a first portion, which is determined according to the precision, of color data expressing the input image; a color converting unit that converts the color data included in the input image into output color data by referring to the specified address of the color conversion table; a parameter specifying unit that specifies a parameter for interpolating a color, which is expressed by the output color data, on the basis of a second portion other than the first portion of the color data included in the input image; and an interpolation unit that interpolates a color, which is expressed by the converted output color data, on the basis of the specified parameter.

In the image processing device according to the aspect of the invention, a color conversion table used for color conversion, an address that refers to the color conversion table at the time of color conversion, and a parameter for interpolating a color after color conversion are determined according to the precision of color conversion designated by the specifying unit. Accordingly, it is possible to provide a device capable of meeting color conversion with various kinds of precision. In addition, not only the entire portion excluding the first portion but also a predetermined portion of a portion excluding the first portion may be included in a range of the second portion other than the first portion.

In the image processing device having the configuration described above, the size of the address space of the color conversion table may be determined on the basis of a value obtained by multiplying the number of steps of a color depth of the output color data, which is determined according to the designated precision, three times. According to the image processing device having the configuration described above, the size of the color conversion table can be specified according to the precision designated by the specifying unit.

Furthermore, in the image processing device having the configuration described above, the address specifying unit may specify the address by dividing color data included in the input image into high-order bit data and low-order bit data on a boundary determined according to the color depth and treating the high-order bit data as the first portion. According to such a configuration, color data included in image data can be divided into data used to specify an address and the other data according to the precision designated by the specifying unit.

Furthermore, in the above configuration, the color depth (=D) and the bit number (=U) of the high-order bit data may satisfy the following relationship of $D=2^U$ or $D=2^U+1$ (where "^" is a symbol indicating the power).

Furthermore, in the image processing device having the configuration described above, the parameter specifying unit may treat the low-order bit data as the second portion. In such a configuration, a part of color data included in image data can be used as a parameter for interpolating the output color data after color conversion. Specifically, assuming that the bit number of the low-order bit data is "L", the interpolation unit interpolates the output color data, of which a color depth is reduced by the color converting unit, by an interpolation operation determined on the basis of which position a coordinate indicated by the low-order bit data exists within a cubic region where a length of one side is $E(-2^L)$.

In addition, the invention may also be configured as, for example, an image display device or a projector, a method of outputting an image by using an image processing device, and a computer program for changing a color tone of an output image in addition to the configuration as the image processing device described above. Such a computer program may be recorded in a computer-readable recording medium. Various kinds of mediums, such as a flexible disk, a CD-ROM, a DVD-RON, a magneto-optic disk, a memory card, and a hard disk, may be used as the recording mediums, for example.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, in order to clarify operations and effects of the invention, an explanation will be made in the following order on the basis of embodiments of the invention.

Figure 1:
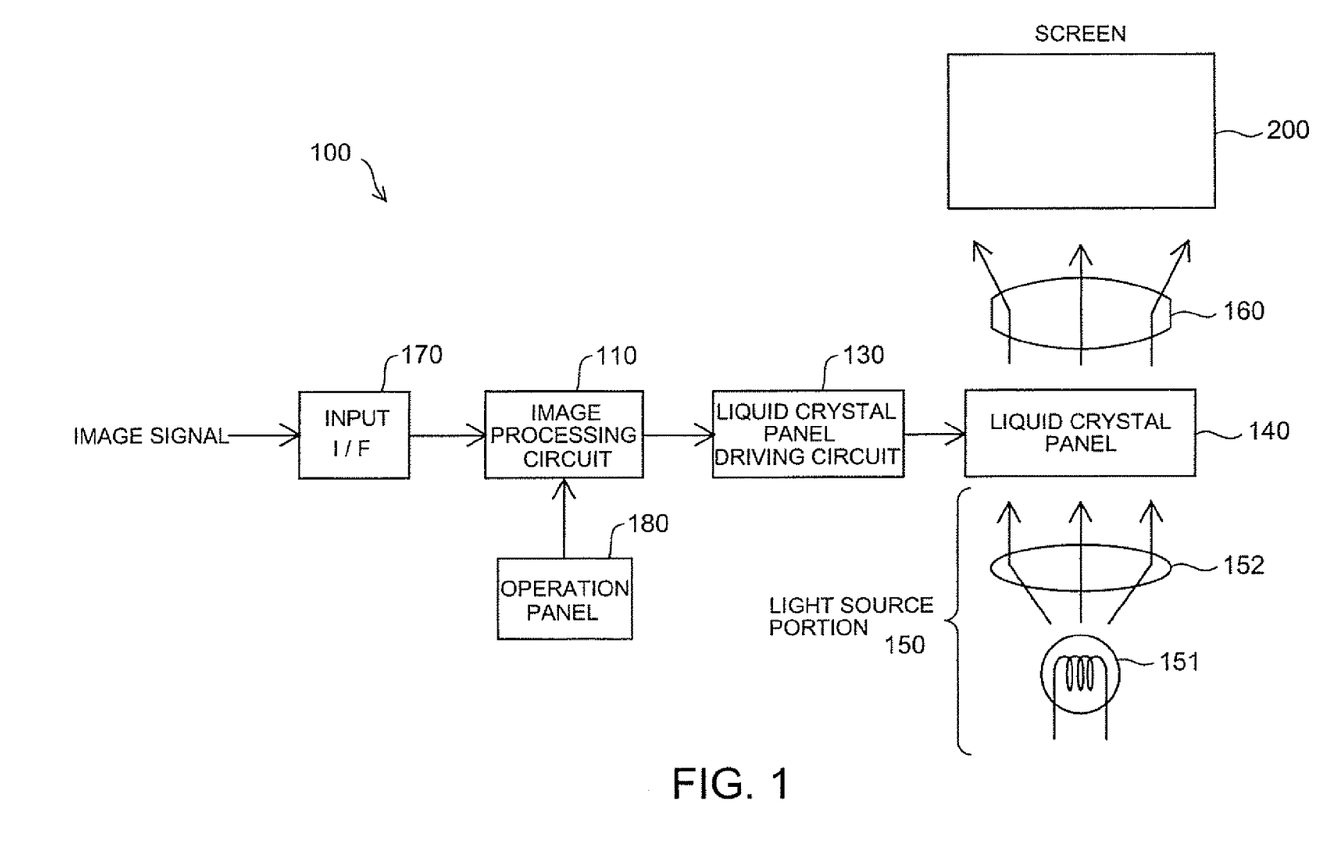
FIG. 1 is an explanatory view illustrating the schematic configuration of a projector.

A. Configuration of projector
B. Configuration of image processing circuit
C. Modifications A. Configuration of Projector FIG. 1 is an explanatory view schematically illustrating the configuration of a projector 100 according to an embodiment of the invention. As shown in the drawing, the projector 100 according to the embodiment includes an input interface 170, an image processing circuit 110, a liquid crystal panel driving circuit 130, a liquid crystal panel 140, a light source portion 150, a projection lens 160, and an operation panel 180.

An external device that outputs an image signal is connected to the input interface 170. The input interface 170 includes a circuit that performs A/D conversion of an analog image signal input from the external device and generates a digital signal having 8-bit data, that is, 256-step data corresponding to each color of R (red), G (green), and B (blue). An external device connected to the input interface 170 includes a DVD player, a video cassette recorder, and a personal computer, for example.

The image processing circuit 110 is input with a digital signal output from the input interface 170 and converts a color tone of an image expressed by the digital signal. The projector 100 includes a plurality of image output modes that are preset, and the image processing circuit 110 converts the color tone of an image according to the image output modes. In the present embodiment, a "cinema mode" in which conversion into a color tone suitable for watching a movie is performed, a "television mode", suitable for watching a television program, and a "presentation mode" suitable for making a presentation are assumed as image output modes.

In the cinema mode, the image processing circuit 110 performs highly precise color conversion using a 3D-LUT having a 17-step color depth. In addition, in the television mode, the image processing circuit 110 performs color conversion with intermediate precision using a 3D-LUT having a 9-step color depth. In addition, in the presentation mode, the image processing circuit 110 performs color conversion with low precision using a 3D-LUT having a 5-step color depth. That is, in the present embodiment, the precision of color conversion performed on an input image varies according to an image output mode.

The operation panel 180 includes an operation button used when a user sets an image output mode. The operation panel 180 is connected to the image processing circuit 110. The image processing circuit 110 changes an output mode of an image according to an operation signal input from the operation panel 180.

To the liquid crystal panel driving circuit 130, an image after color tone conversion, which is output from the image processing circuit 110, is input as a digital signal. Then, the liquid crystal panel driving circuit 130 drives the liquid crystal panel 140 according to the digital signal.

The liquid crystal panel 140 is a transmissive light valve that is controlled by the liquid crystal panel driving circuit 130 and that forms an image using a liquid crystal element. When light emitted from the light source portion 150 is incident on the liquid crystal panel 140, the liquid crystal panel 140 modulates the light and emits the light to a side of a screen 200.

The light source portion 150 is a light source that emits light toward the liquid crystal panel 140. The light source portion 150 includes a lamp 151, from which light is emitted, and a lens 152, which emits the light generated in the lamp toward a liquid crystal panel, as main components.

The projection lens 160 is a lens that projects modulated light, which is emitted from the liquid crystal panel 140, toward the screen 200 side in an enlarged manner.

In the projector 100 having the configuration described above, it is possible to convert the color tone of an image, which is input by the input interface 170, using the image processing circuit 110 and to project the image whose color tone is converted on the screen 200.

B. Configuration of Image Processing Circuit

Figure 2:
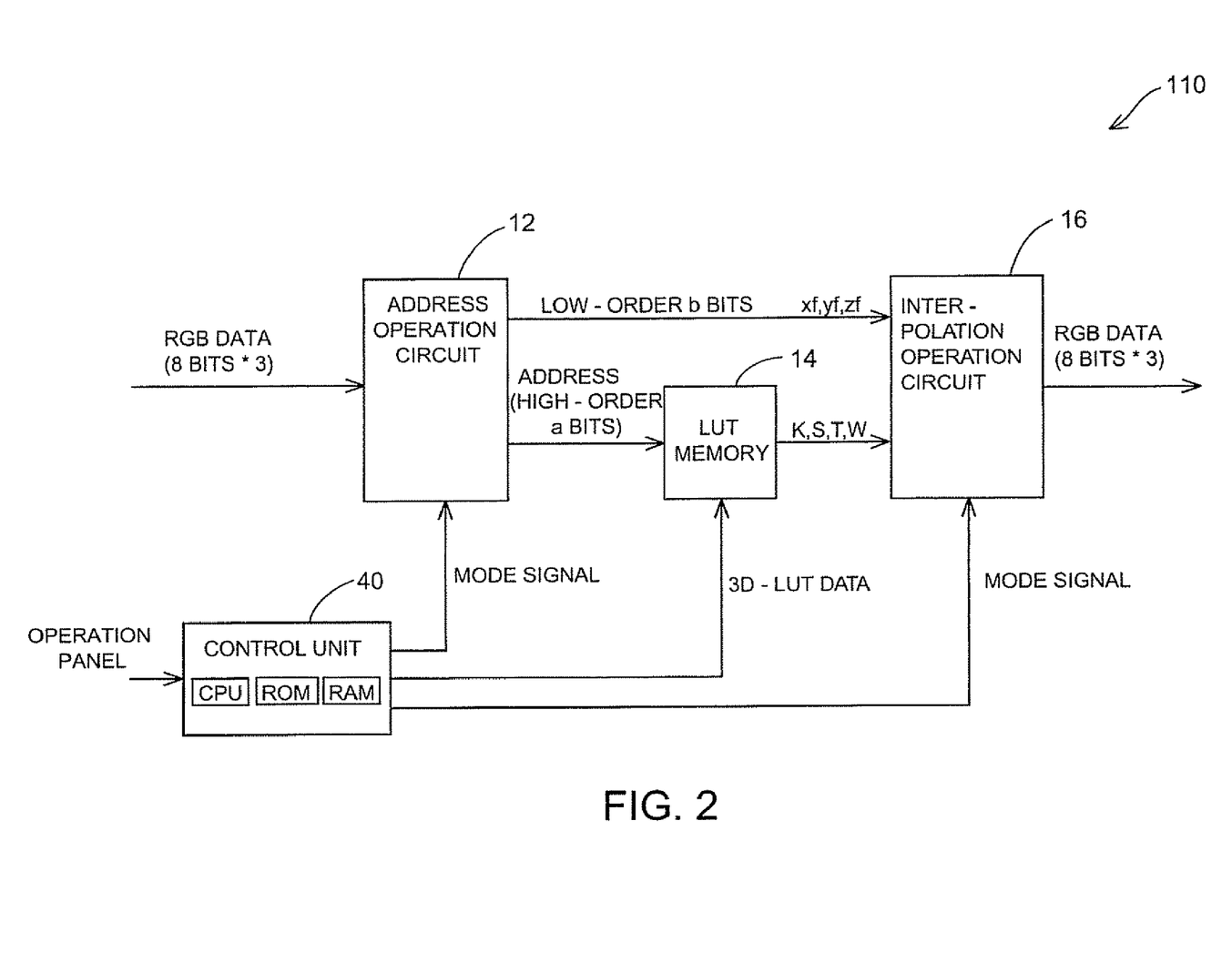
FIG. 2 is a block diagram illustrating the specific configuration of an image processing circuit.

FIG. 2 is a block diagram illustrating the specific configuration of the image processing circuit 110 shown in FIG. 1. As shown in the drawing, the image processing circuit 110 includes an address operation circuit 12, an LUT memory 14, an interpolation operation circuit 16, and a control unit 40. The address operation circuit 12 corresponds to an "address specifying portion" a "color converting portion", and a "parameter specifying portion", and the LUT memory 14 corresponds to a "color conversion table" and a "color converting portion". In addition, the interpolation operation circuit 16 corresponds to an "interpolation portion".

The control unit 40 is a unit that performs an overall control of the projector 100. The control unit 40 includes a CPU, a ROM, and a RAM. The CPU controls the projector 100 by loading a control program stored in the RON to the RAM and executing the control program.

In addition, 3D-LUT data prepared beforehand for every image output mode is stored in a non-volatile state in the ROM. When the control unit 40 receives setting of an image output mode from a user through the operation panel 180, the control unit 40 read the 3D-LUT data corresponding to the mode from the ROM and writes the 3D-LUT data in the LUT memory 14. Thus, the image processing circuit 110 can perform color conversion on the basis of the 3D-LUT data stored in the LUT memory 14.

The control unit 40 outputs a mode signal, which indicates a state of an image output mode set by a user, to the address operation circuit 12 and the interpolation operation circuit 16.

The address operation circuit 12 and the interpolation operation circuit 16 perform operation and interpolation processing on an address on the basis of the mode signal.

The LUT memory 14 is a memory circuit in which the 3D-LUT is stored. The 3D-LUT is configured such that RGB data after color conversion, which is expressed with a D-step color depth, corresponds to "D×D×D" addresses. For example, in a 3D-LUT corresponding to the cinema mode, RGB data after color conversion corresponds to 4913 (=17× 17×17) addresses. Furthermore, in a 3D-LUT corresponding to the television mode, RGB data after color conversion corresponds to 729 (=9×9×9) addresses. Furthermore, in a 3D-LUT corresponding to the presentation mode, RGB data after color conversion corresponds to 125 (=5×5×5) addresses.

Figure 3:
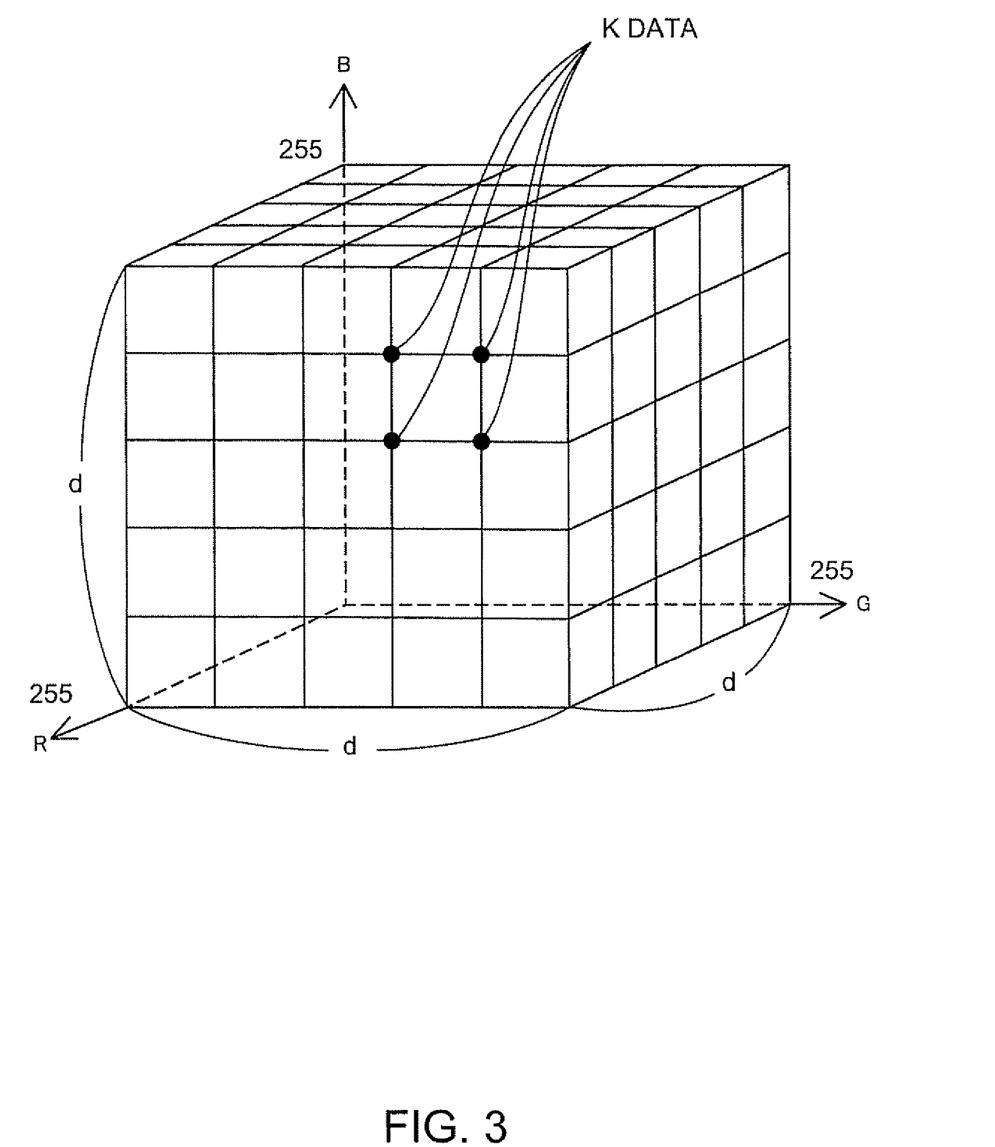
FIG. 3 is an explanatory view schematically illustrating an address space of an LUT memory.

FIG. 3 is an explanatory view schematically illustrating an address space of the LUT memory 14. As described above, "D×D×D" addresses are prepared in the LUT memory 14 and RGB data (hereinafter, referred to as "K data") after color conversion is stored in each of the addresses. That is, assuming that the address space of the LUT memory 14 is a three-dimensional space having an R axis, a G axis, and a B axis as shown in FIG. 3, it may be thought that this space is divided into "D×D×D" (D=5 in the case shown in FIG. 3) cubic regions and K data corresponds to a lattice point of each cubic region.

When there is an access including designation of an address from the address operation circuit 12, the LUT memory 14 outputs K data corresponding to the address to the interpolation operation circuit 16 to be described later. At this time, in addition to the K data, the LUT memory 14 outputs three kinds of RGB data, which is adjacent to the K data in a three-dimensional space, to the interpolation operation circuit 16. The data is called "W data", "S data", and "T data", respectively. Such data is supplied for interpolation processing of K data in the interpolation operation circuit 16. Details of the interpolation processing will be described later.

The address operation circuit 12 calculates an address accessing the LUT memory 14 on the basis of RUB data (hereinafter, referred to as "original RGB data") input from the input interface 170. Specifically, high-order U-bit data is taken out as a first portion from original RUB data for every R, G, and B, and an address for accessing the LUT memory 14 is obtained by using the U-bit data taken out as described above. The address obtained herein specifies one cubic region among the "D×D×D" cubic regions shown in FIG. 3.

The address operation circuit 12 varies the bit number "U" according to a mode signal input from the control unit 40. Specifically, when the mode signal indicates a cinema mode, the address operation circuit 12 sets the bit number "U" to "4". In addition, when the mode signal indicates a television mode, the bit number "U" is set to "3". In addition, when the mode signal indicates a presentation mode, the bit number "U" is set to "2". That is, the address operation circuit 12 takes out data corresponding to a bit number, which is needed when a value obtained by deducting "1" from a color depth D of an image output mode set by a user is expressed as a binary number, from high-order bits of the original RGB data. The relationship between the color depth D and the bit number U is expressed as an expression of "D=2^U+1". Here, "^" is a symbol indicating the power.

Figure 4:
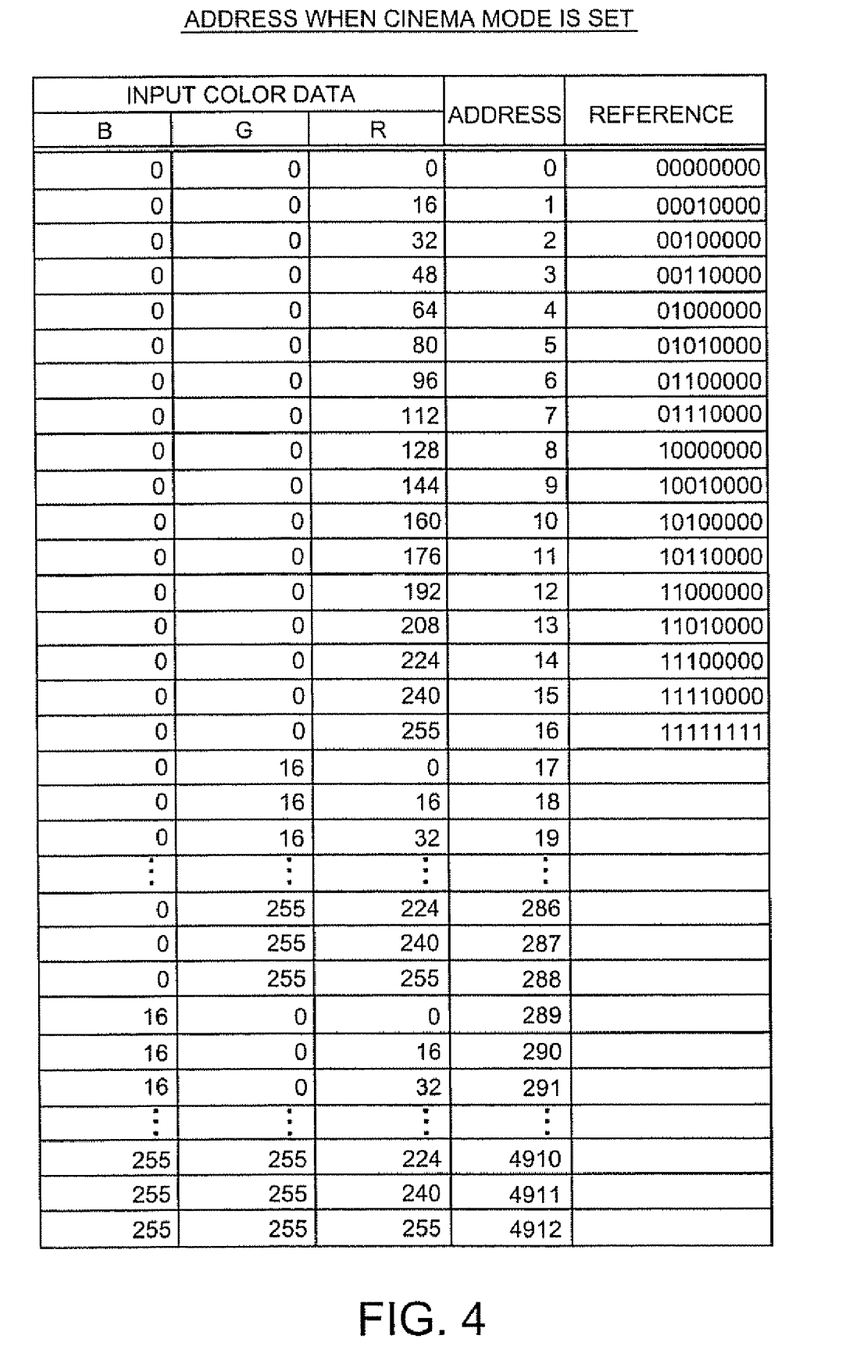
FIG. 4 is an explanatory view illustrating a method of calculating an address when a cinema mode is set.

FIG. 4 is an explanatory view illustrating a method of calculating an address when a cinema mode is set. Since the bit number "U" is "4" when setting the cinema mode, the address operation circuit 12 takes out high-order 4-bit data from the original RGB data for every R, G, and B. Then, the original RGB data with 256 steps of each color is converted into a value with 16 steps (0 to 15) of each color by the 4-bit data. The address operation circuit 12 makes addresses of the 3D-LUT correspond to all combinations of the 4-bit data in advance. In this manner, the address operation circuit 12 can easily acquire addresses of the 3D-LUT when setting the cinema mode. However, in the case when any one of the original R, G, and B data is "255", an address that cannot be acquired only by high-order 4-bit data is prepared specially in order to suppress an error of an interpolation operation performed by the interpolation operation circuit 16, which will be described later. Among addresses shown in FIG. 4, those corresponding to the special addresses are addresses "17", "288", and "4912". That is, in the case when a value of any one of R, G, and B among the original RGB data is "255", the address operation circuit 12 calculates the special address corresponding to the combination of R, G, and B having the value. In other cases, the address operation circuit 12 calculates an address using high-order 4-bit data.

Figure 5:
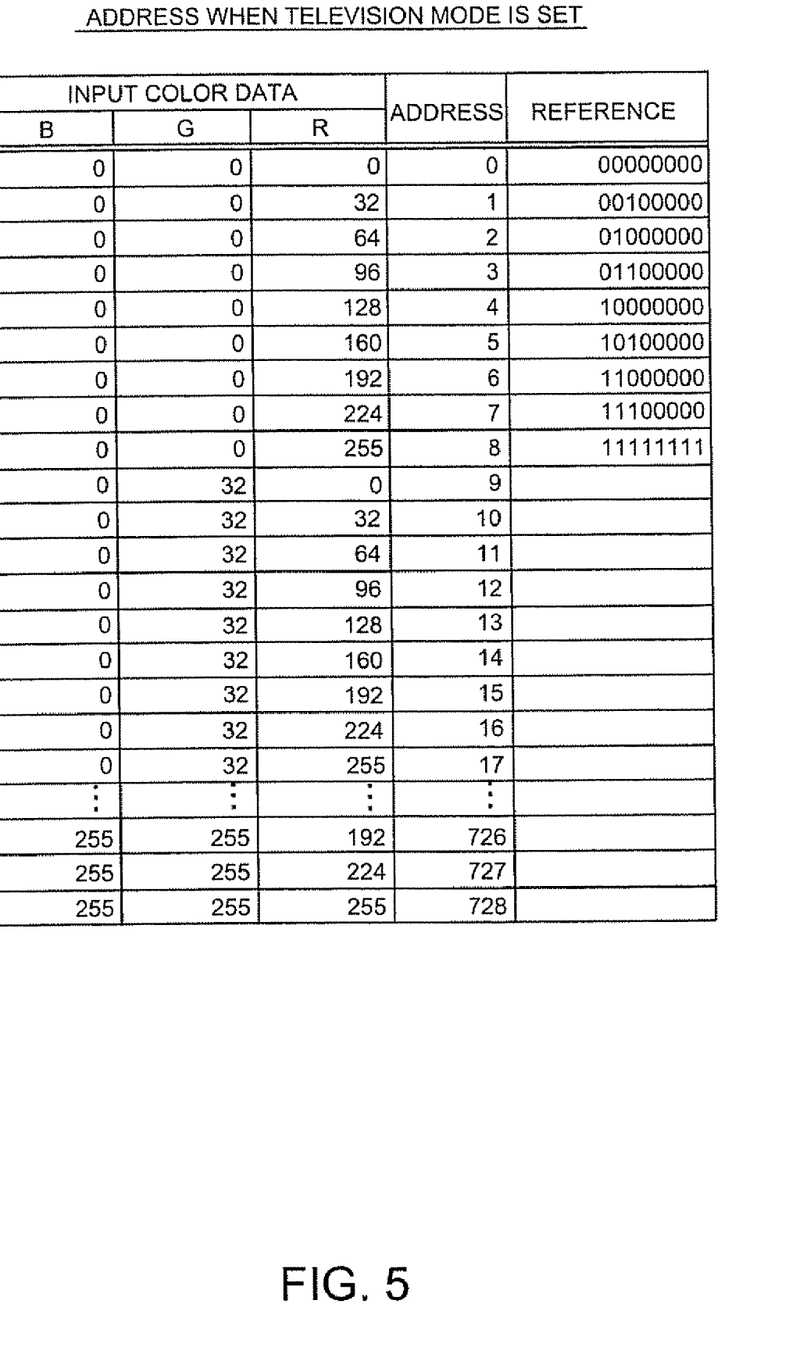
FIG. 5 is an explanatory view illustrating a method of calculating an address when a television mode is set.
Figure 6:
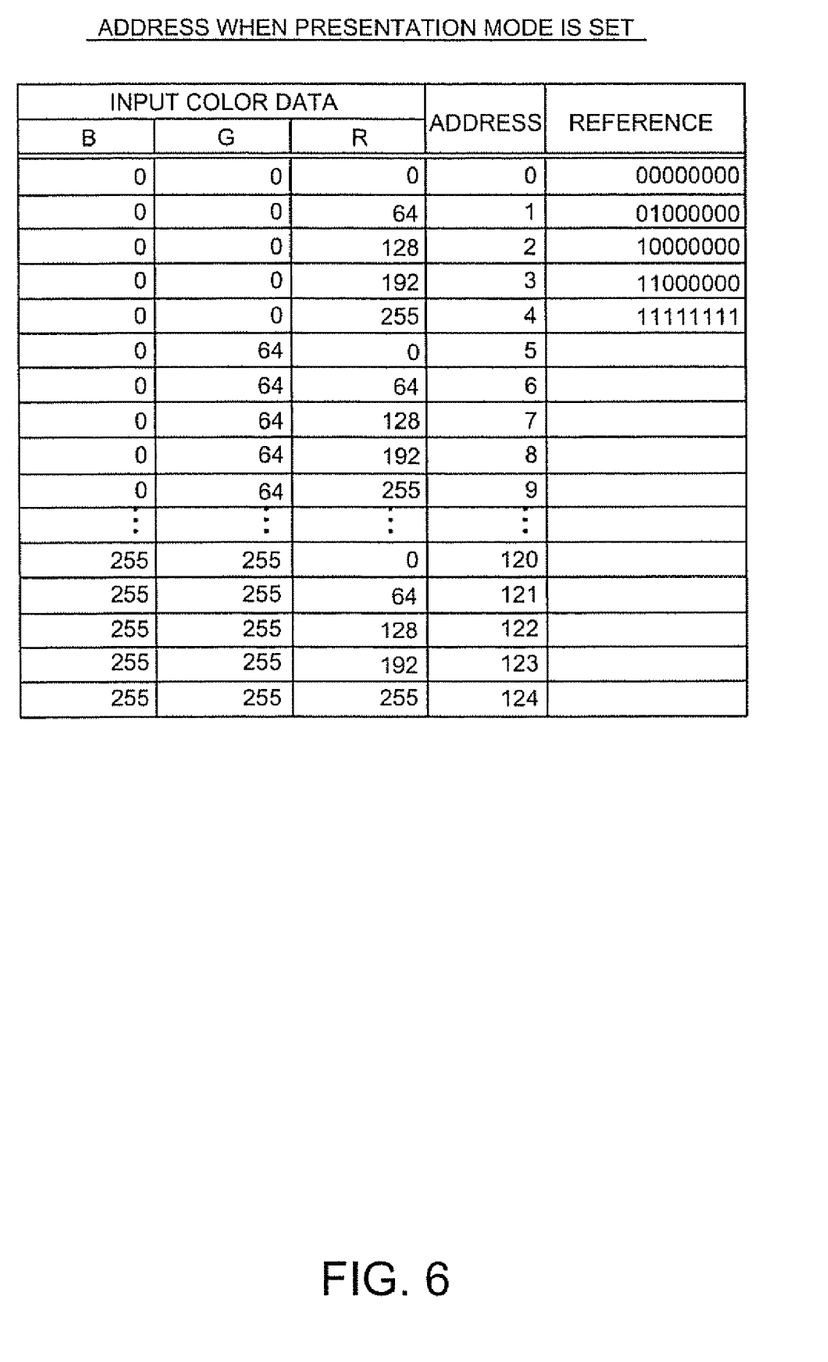
FIG. 6 is an explanatory view illustrating a method of calculating an address when a presentation mode is set.

FIG. 5 is an explanatory view illustrating a method of calculating an address when a television mode is set. In addition, FIG. 6 is an explanatory view illustrating a method of calculating an address when a presentation mode is set. Even in these modes, it is possible to calculate addresses of the LUT memory 14 by taking out high-order U-bit data from original RGB data in the same method as when the cinema mode is set.

Furthermore, the address operation circuit 12 takes out low-order L-bit (L=8−U) data as a second portion from original RGB data for every R, G, and B and then outputs the data to the interpolation operation circuit 16. Specifically, when the cinema mode is set, the address operation circuit 12 takes out low-order 4-bit data of the original RGB data for every R, G, and B and then outputs the data to the interpolation operation circuit 16. Similarly, low-order 5-bit data is output to the interpolation operation circuit 16 when the television mode is set, and low-order 6-bit data is output to the interpolation operation circuit 16 when the presentation mode is set. Such data is used as parameters for interpolating K data output from the LUT memory 14 in the interpolation operation circuit 16. Thus, in the present embodiment, data of all portions excluding high-order U bits is used as parameters for the interpolation operation. However, a specific portion of low-order bits excluding the high-order U bits may also be used as a parameter for the interpolation operation. In the following description, it is assumed that low-order L-bit data of R data is "xf data", low-order L-bit data of C data is "yf data", and low-order L-bit data of B data is "zf data".

The address operation circuit 12 performs processing for selecting one tetrahedron from six tetrahedrons included in one cubic region, which is specified by high-order U-bit data of the original RGB data, on the basis of the size relationship among xf data, yf data, and zf data. When the one tetrahedron is selected, the address operation circuit 12 outputs an identification signal for identifying the selected tetrahedron to the interpolation operation circuit 16. Here, the shape of the selected tetrahedron determines the operation expression of an interpolation operation performed by the interpolation operation circuit 16.

Figure 7:
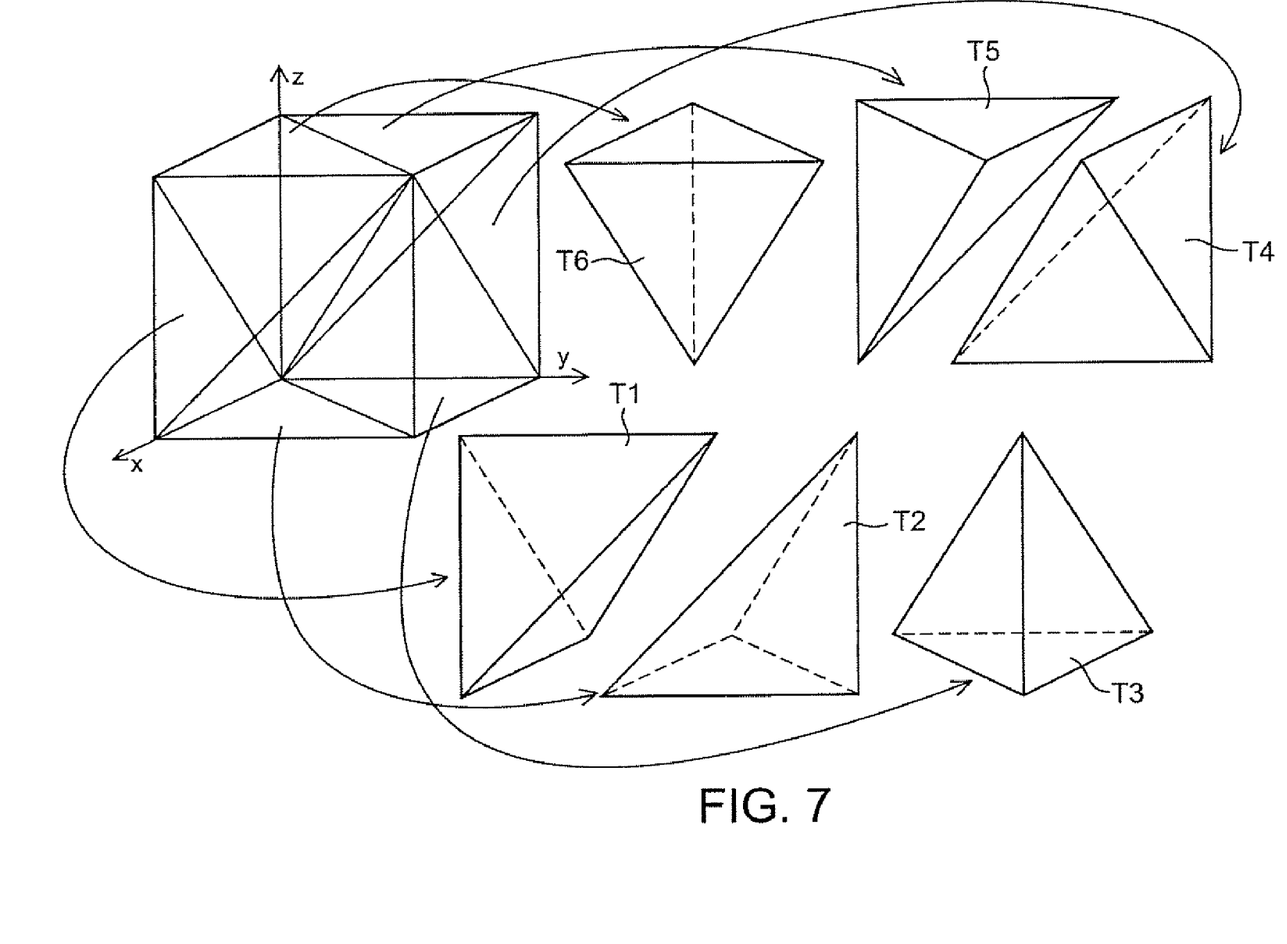
FIG. 7 is an explanatory view illustrating types of six tetrahedrons included in one cubic region.

FIG. 7 is an explanatory view illustrating types of six tetrahedrons included in one cubic region. As shown in the drawing, the six tetrahedrons are obtained by dividing a cubic region using three surfaces expressed by three kinds expressions of x=y, y=z, and z=x. Accordingly, regions possessed by six tetrahedrons T1 to T6 are expressed by the following six conditional expressions. That is, expression (1), expression (2), expression (3), expression (4), expression (5), and expression (6) expresses the first tetrahedron T1, the second tetrahedron T2, the third tetrahedron T3, the fourth tetrahedron T4, the fifth tetrahedron T5, and the sixth tetrahedron T6, respectively.

$$x \geq z \geq y \quad (1)$$

$$x \geq y > z \quad (2)$$

$$y > x \geq z \quad (3)$$

$$y > z > x \quad (4)$$

$$z \geq y > x \quad (5)$$

$$z > x \geq y \quad (6)$$

Figure 8:
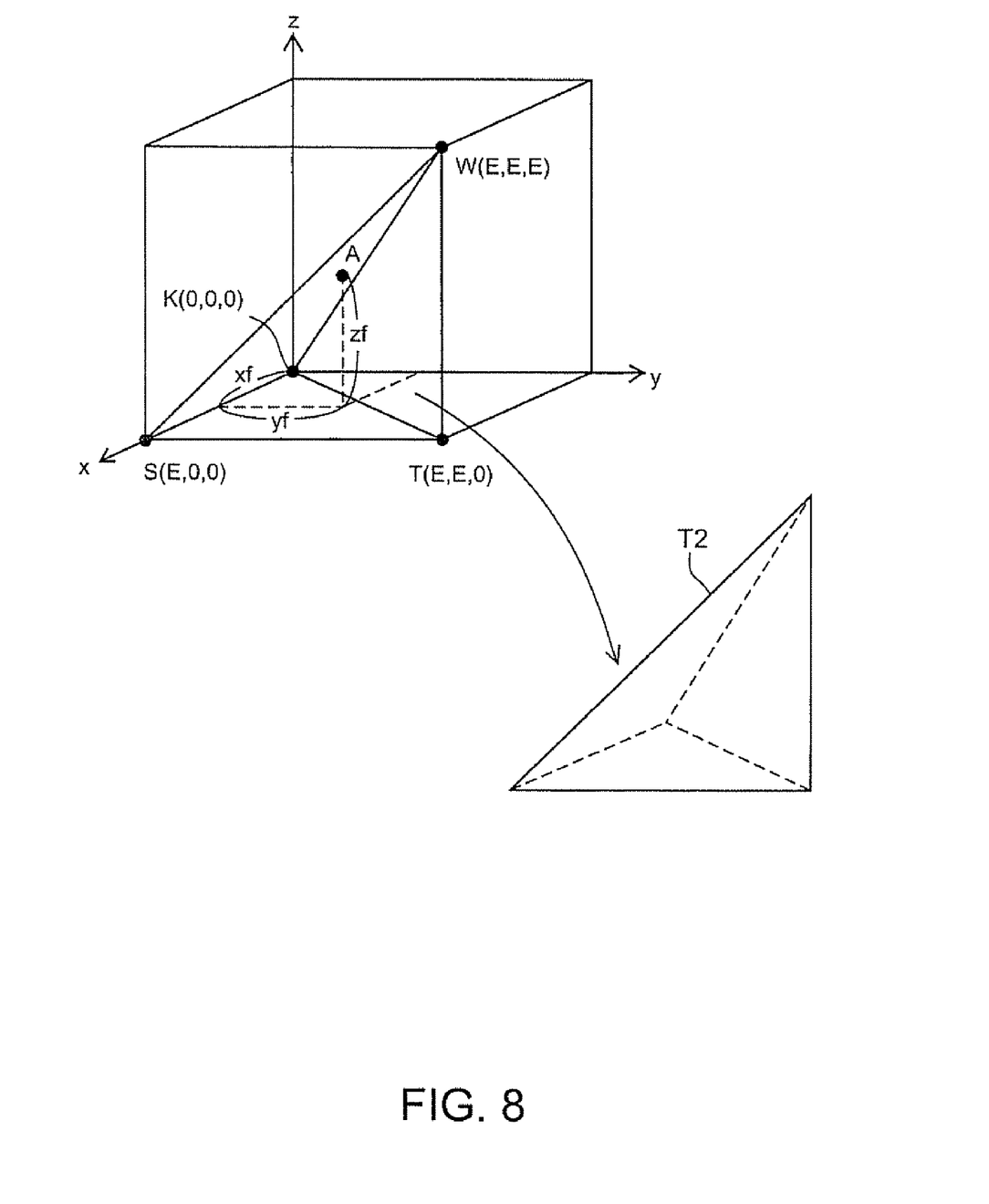
FIG. 8 is an explanatory view conceptually illustrating how a tetrahedron is selected by an address operation circuit.

FIG. 8 is an explanatory view conceptually illustrating how a tetrahedron is selected by the address operation circuit 12. As shown in the drawing, assuming that a coordinate within a cubic region determined by xf data, yf data, and zf data is A(xf, yf, zf), the address operation circuit 12 can determine in which tetrahedron the coordinate A exists by checking which one of the expressions (1) to (6) is satisfied by the coordinate. In the example shown in FIG. 8, since the coordinate A satisfies a condition of the expression (2), the second tetrahedron T2 is selected by the address operation circuit 12.

After the tetrahedron is selected as described above, the address operation circuit 12 determines "W data", "S data", and "T data", which are output to the interpolation operation circuit 16, on the basis of the shape of the tetrahedron as follows.

An origin of the xyz coordinate shown in FIG. 8 corresponds to a lattice point (hereinafter, referred to as a "K point") at which the "K data" is located. Here, a point farthest from the K point among eight apices of the cubic region shown in FIG. 8 is set to a W point. The W point is a point of expressing a color closest to a white color in a cubic region. The address operation circuit 12 accesses an address of the LUT memory 14 where the W point exists. Then, the "W data" is output from the LUT memory 14 to the interpolation operation circuit 16. The w point exists at the same position as a "K point" of a cube that is adjacent to a side of the cube, which is shown in FIG. 8, in the front upper right direction thereof. Therefore, "K data" stored in the address is output as "W data" to the interpolation operation circuit 16 by accessing an address corresponding to the K point of the cube adjacent thereto.

In the present embodiment, of two points other than the K point and the W point that form the second tetrahedron T2, one point close to the K point is set as an S point and the remaining one point is set as a T point. The address operation circuit 12 accesses an address of the LUT memory 14 where the S point and the T point exist. Then, the "S data" and the "T data" are output from the LUT memory 14 to the interpolation operation circuit 16. That is, "K data" corresponding to a K point of a tetrahedron that is adjacent to a front side of the cube shown in FIG. 8 is output as "S data", and "K data" corresponding to a K point of a tetrahedron that is adjacent to an inclined front side of the cube shown in FIG. 8 is output as "T data". Moreover, in the present embodiment, regardless of which tetrahedron is selected by the address operation circuit 12, a point, which is close to the K point, of two points other than the K point and the W point is set as an S point and the remaining one point is set as a T point.

The interpolation operation circuit 16 is input with "K data" output from the LUT memory 14 and performs processing for interpolating the "K data" to the 256-step color depth. That is, the interpolation operation circuit 16 performs processing for interpolating RGB data, of which a color depth has been reduced up to 17 steps in the cinema mode, 9 steps in the television mode, and 5 steps in the presentation mode, up to 256 steps that are the same color depth as original RGB data.

To the interpolation operation circuit 16, the xf data, the yf data, and the zf data are input from the address operation circuit 12 and a signal for identifying the selected tetrahedron is input. In addition, the K data, the W data, the S data, and the T data are input from the LUT memory 14 to the interpolation operation circuit 16. In addition, the interpolation operation circuit 16 performs an operation of interpolating the K data using those data. When the K data after interpolation is expressed as "KK", the "KK" can be calculated by the following expression (7). The interpolation operation circuit 16 is configured to include an adder or subtracter, a multiplier, and a divider for realizing the expression (7). The interpolation operation circuit 16 can output RGB data having a 256-step color depth by performing the calculation for all of the R data, the G data, and the B data included in the K data. A method of the interpolation operation using a tetrahedron is disclosed in detail in JP-B-58-16180. By adopting the following expression (7), it becomes possible to reduce the number of multipliers compared with a case of adopting the expression disclosed in JP-B-58-16180. As a result, the circuit size of the interpolation operation circuit 16 can be made small.

$$KK = K + (W-K) \cdot h/E - (W-T) \cdot (h-n)/E - (T-S) \cdot (h-m)/E \quad (7)$$

In addition, the interpolation operation circuit 16 substitutes xf data, yf data, and zf data for parameters "h", "m", and "n" of the above expression according to the type of a tetrahedron indicated by an identification signal input from the address operation circuit 12. Specifically, the substitution is performed according to the following conditions.

First tetrahedron $T1$: $h=xf$, $m=zf$, and $n=yf$     (a)

Second tetrahedron $T2$: $h=xf$, $m=yf$, and $n=zf$     (b)

Third tetrahedron $T3$: $h=yf$, $m=xf$, and $n=zf$     (c)

Fourth tetrahedron $T4$: $h=yf$, $m=zf$, and $n=xf$     (d)

Fifth tetrahedron $T5$: $h=zf$, $m=yf$, and $n=xf$     (e)

Sixth tetrahedron $T6$: $h=zf$, $m=xf$, and $n=yf$     (f)

Furthermore, the parameter "E" of the above expression (7) indicates the length of one side of the cubic region shown in FIG. 8. A value of the parameter depends on the color depth at the time of color conversion in each image output mode. That is, in the case of a cinema mode, the value of E is set to "1" since RGB data has a discrete value every 16 values, as shown in FIG. 4. Furthermore, in the case of a presentation mode, the value of E is set to "64", since original RGB data has a discrete value every 64 values, as shown in FIG. 6. The relationship is expressed as an expression of "E=2^L". The interpolation operation circuit 16 sets the value of E according to a mode signal input from the control unit 40.

In the projector 100 according to the present embodiment described above, when a user sets an image output mode through the operation panel 180, the 3D-LUT corresponding to the image output mode is stored in the BUT memory 14. Furthermore, in the address operation circuit 12, calculation of an address corresponding to the image output mode is performed. Furthermore, in the interpolation operation circuit 16, a parameter substituted for the above expression (7) corresponding to the image output mode is changed. Therefore, in the projector 100 according to the present embodiment, color conversion corresponding to various kinds of precision can be performed with one kind of image processing circuit 110.

Furthermore, in the present embodiment, the precision of color conversion is made to change according to an image output mode set by a user. In contrast, the precision of color conversion may be fixed for every model of the projector 100, for example, such that a projector for movie fans has a 17-step color depth or a projector in a low price range has a 9-step color depth. The image processing circuit 110 provided in the projector 100 according to the present embodiment can perform color conversion with various kinds of precision as described above. Therefore, the image processing circuit 110 in the present embodiment can be mounted in common in different kinds of projectors. As a result, since a member can be shared, it becomes possible to reduce a manufacturing cost. In this case, designation of an image output mode to the address operation circuit 12 and the interpolation operation circuit 16 is not designation made by the control unit 40 but may be performed by a DIP switch, a jumper pin, or a fixed circuit.

C. Modifications

While various embodiments of the invention have been described, the invention is not limited to such embodiments but various modifications may be made within the scope without departing from the subject matter or spirit of the invention. For example, a function realized by hardware may be realized by software. In addition, the following modifications may also be made.

C1. First Modification

In the embodiment described above, a special address of the 3D-LUT is calculated in the case where original RGB data is "255". However, the special address may not be prepared. In this case, the address operation circuit 12 can perform calculation of an address with only high-order U-bit data. In this case, the relationship between the color depth D after color conversion and the bit number U of high-order bits is D=2^U.

C2. Second Modification

In the embodiment described above, the above expression (7) is adopted as an expression for performing an interpolation operation. However, the following expressions (8) and (9) which are expressions equivalent to the expression (7) may also be adopted.

$$KK=K\cdot(1-h/E)+S\cdot((h-m)/E)+T\cdot((m-n)/E)+W\cdot n/E \quad (8)$$

$$KK=K+(S-K)\cdot h/E+(T-S)\cdot m/E+(W-T)\cdot n/E \quad (9)$$

C3. Third Modification

In the embodiment described above, the liquid crystal panel 140 is used as a light valve that modulates light emitted from the light source portion 150. However, elements, such as a DMD (digital micromirror device) and an LCOS (liquid crystal on silicon), may also be used as light valves. In addition, an image may also be projected on a screen using CRT. In addition, the "DMD" is a trademark of Texas Instrument, Inc., USA.

C4. Fourth Modification

In the embodiment described above, the image processing circuit 110 shown in FIG. 2 is mounted in the projector 100, However, the image processing circuit 110 may also be mounted in monitor direct view type display devices, such as a liquid crystal display, a plasma display, and a CRT display. In addition, the image processing circuit 110 may also be mounted in image output devices, such as a DVD player, a DVD recorder, a video cassette recorder, and a personal computer. In addition, the projector 100 may be a front projector or a rear projector.

What is claimed is:

1. An image processing device comprising:
   an input unit to which first color data expressing an image is input;
   a designation unit that designates a precision of color conversion performed on the input image;
   a color conversion table that stores second color data, which is determined according to the designated precision, in an address space determined according to the precision;
   an address specifying unit that specifies an address for referring to the color conversion table on the basis of a first portion of the first color data, which is determined according to the designated precision;
   a color converting unit that converts the first color data into the second color data by referring to the specified address of the color conversion table;
   a parameter specifying unit that specifies a parameter for interpolating third color data, on the basis of a second portion other than the first portion of the first color data; and
   an interpolation unit that interpolates the third color data, on the basis of the second color data and the specified parameter.

2. The image processing device according to claim 1, wherein the size of the address space of the color conversion table is determined on the basis of a value obtained by multiplying a color depth of the second color data, which is determined according to the designated precision, three times.

3. The image processing device according to claim 2, wherein the address specifying unit specifies the address by dividing the first color data into high-order bit data and low-order bit data on a boundary determined according to the color depth and treating the high-order bit data as the first portion of the first color data.

4. The image processing device according to claim 3, wherein the color depth (=D) and the bit number (=U) of the high-order bit data satisfy the following relationship of D=2^U or D=2^U+1 (where "^" is a symbol indicating the power).

5. The image processing device according to claim 3, wherein the parameter specifying unit treats the low-order bit data as the second portion of the first color data.

6. The image processing device according to claim 5, wherein assuming that the bit number of the low-order bit data is "L", the interpolation unit interpolates the third color data on the basis of which position a coordinate indicated by the low-order bit data exists within a cubic region, where a length of one side of the cubic region is E(=2^L), of the address space.

7. An image display device comprising:
   the image processing device according to claim 1; and
   a display unit that displays the image based on the third color data.

8. The image display device according to claim 7 configured as a projector.

* * * * *